United States Patent [19]

Watanabe

[11] Patent Number: 5,317,746
[45] Date of Patent: May 31, 1994

[54] MESSAGE-BASED DATA PROCESSING SYSTEM THAT PROVIDES CHECKING FOR ACCESS TO SERVER SPACE

[75] Inventor: Kazuko Watanabe, Kawasaki, Japan

[73] Assignee: Fujitsu Limited, Kawasaki, Japan

[21] Appl. No.: 889,925

[22] Filed: Jun. 2, 1992

[30] Foreign Application Priority Data

Jun. 12, 1991 [JP] Japan .................................. 3-139355

[51] Int. Cl.⁵ .............................................. G06F 12/14
[52] U.S. Cl. .............................. 395/700; 364/DIG. 1;
364/280.9; 364/286.5
[58] Field of Search ... 364/DIG. 1, DIG. 2 MS File;
395/700

[56] References Cited

U.S. PATENT DOCUMENTS

| | | | |
|---|---|---|---|
| 4,584,639 | 4/1986 | Hardy | 264/DIG. 1 |
| 5,136,712 | 8/1992 | Perazzoli, Jr. et al. | 395/700 |
| 5,187,790 | 2/1993 | East et al. | 364/DIG. 1 |

Primary Examiner—Thomas M. Heckler
Attorney, Agent, or Firm—Staas & Halsey

[57] ABSTRACT

A data processing system of client/server architecture operating on a message basis comprises client spaces capable of issuing processing requests in the form of messages, and server spaces for executing the processing as requested by checking a request code contained in the message. The request codes are previously classified into client-space dedicated codes and kernel-space dedicated codes. A message communication facility for performing message transfer between the clients and the servers includes a check function for checking whether the message originates in the kernel space when the request code contained in the message is the kernel-space dedicated code. The processing request message issued from a space other than the kernel space by using the kernel space dedicated code is rejected as an error. Security of the system can thus be assured.

7 Claims, 5 Drawing Sheets

| SPACE-CONTROL TABLE (#1) |
|---|
|  |
| SUCCEEDING SPACE CONTROL TABLE |
| ATTRIBUTES (KERNEL/SERVER/OTHERS) |
| SECURITY INFORMATION |
| PROCESS ID |
| POINTER TO ADDRESS TRANSLATION TABLE |
|  |

| SPACE-CONTROL TABLE (#2) |
|---|
|  |
| SUCCEEDING SPACE CONTROL TABLE |
| ATTRIBUTES (KERNEL/SERVER/OTHERS) |
| SECURITY INFORMATION |
| PROCESS ID |
| POINTER TO ADDRESS TRANSLATION TABLE |
|  |

FIG. 4

MESSAGE FORMAT

| (a) | (b) | (c) | (d) |
|---|---|---|---|

(a) : SENDER INFORMATION (PROCESS ID)
(b) : CAPABILITY
(c) : REQUEST CODE
(d) : DETAILED INFORMATION, ETC.

FIG. 6

MESSAGE-BASED DATA PROCESSING SYSTEM THAT PROVIDES CHECKING FOR ACCESS TO SERVER SPACE

BACKGROUND OF THE INVENTION

1. Field of the Invention

The present invention relates generally to a data processing system which operates on a message basis, and more particularly to a message-based data processing system which includes client spaces and server spaces, wherein a processing request issued by a client space in the form of a message is sent to a server space through a communication facility to be processed by the server space. More particularly, the present invention is concerned with a message-based data processing system of client/server architecture in which a message request code is provided for each of the processing requests issued for the client spaces for the purpose of preventing the client space from accessing a kernel space having privileged functions by checking the request code in the communication facility to thereby ensure the security of the kernel space and hence that of the data processing system.

2. Description of the Related Art

In the field of the data processing system, there has recently been developed and used such an operating system (OS) which is implemented by dividing the function thereof into unitary functions or function units such as a file management function, a terminal management function, a fault management function and so forth. These OS functions resulting from the division are accommodated in spaces referred to as the server spaces, respectively, which are created in a memory space. On the other hand, the primitive part of the operating system or OS which operates in a privileged mode is accommodated in a space referred to as the kernel (or nucleus) space, which may be generally considered as one of the server spaces. In contrast, spaces provided for the application programs such as user programs are referred to as the client spaces to distinguish them from the server spaces. At this juncture, it should however be noted that although the kernel space is one of the server spaces, it may also be regarded to be a client space in the sense that the kernel space issues control messages to the other server spaces, as described later on. Hereinafter, the OS functions will simply be referred to as the server space, with the kernel of the operating system being referred to as the kernel space, while the application programs are termed the client spaces. When a client space desires service from a server space, the former issues a corresponding request in the form of a message to the server space. In response, the server space checks the request message issued from the client space as to whether the request has authorization as required and provides the services to the client space when the request thereof is decided as having the authorization. On the other hand, the kernel space is a specific server space which is imparted with privileged authorizations for fundamental or primitive functions of the operating system such as deletion of the other server space, creation of new server space and the like. The client spaces and the server spaces except for the kernel space are created and/or deleted by the function privileged to the kernel space, wherein disposition of these spaces are managed by a server referred to as a process server space.

In order that a client space can send a processing request message, the client space has to acquire beforehand the so-called capability (i.e. destination or sink of the message). The capabilities of the individual client spaces are supervised by a mediator server. Exceptionally, the capabilities to the mediator server and the process server are imparted to the client spaces upon creation thereof. These capabilities are referred to as the callable capability (C-CAP) and can not request any processing. Any client space having a request for service of the OS function from the server space has to send once a message to the mediator server by using the callable capability for thereby requesting the mediator server to check the authorization of the client server, and only the client space that has passed the authorization check is delivered with a resource capability which allows the client space to issue a request for the desired OS function such as file reference by using the resource capability.

Figure 6:
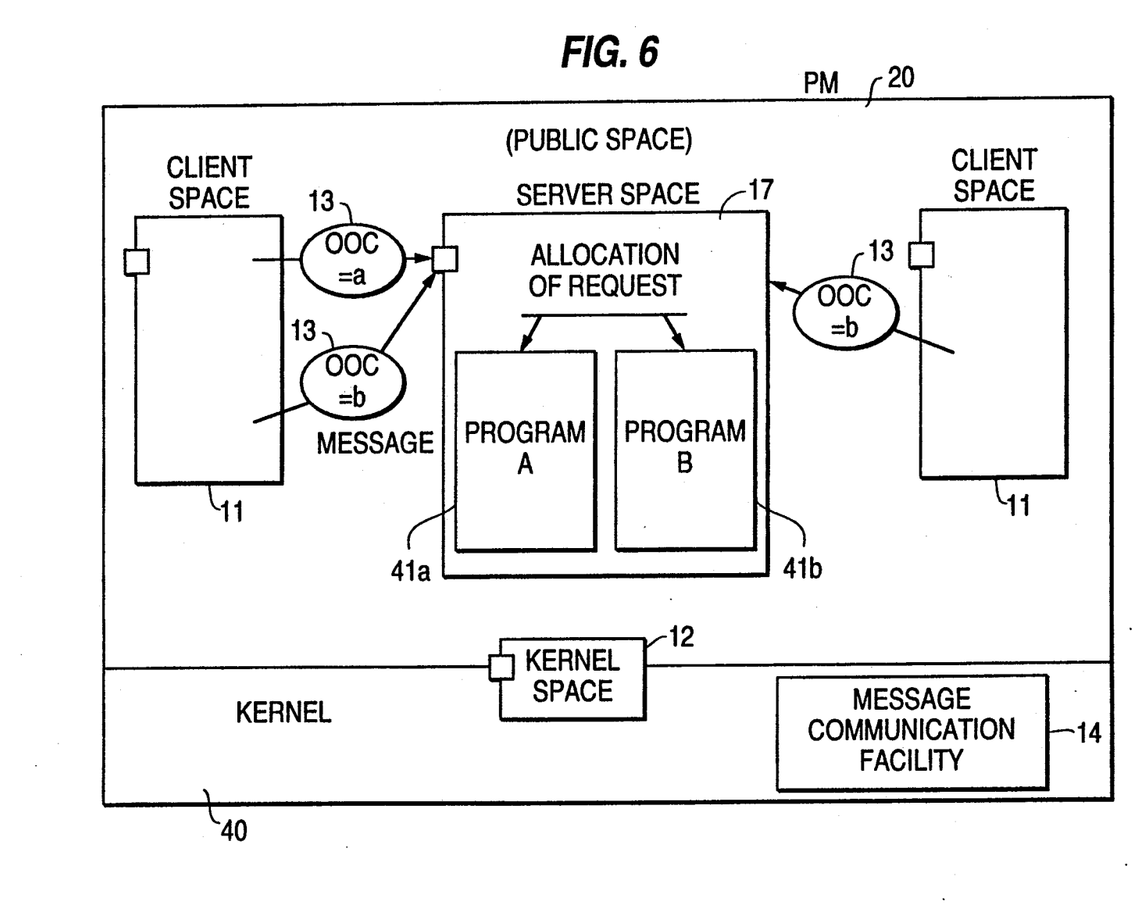
FIG. 6 is a block diagram showing a prior art data processing system.

For a better understanding of the present invention, a description will now be made of the problems of the data processing system which the present invention solves. Referring to FIG. 6 of the accompanying drawings which shows schematically in a block diagram a general arrangement of a message-based data processing system of a client/server space architecture, a reference numeral 20 generally denotes a processor module (PM) constituted by at least one CPU (Central Processing Unit) and a memory. Provided internally of to the processor module 20 are client spaces 11 which accommodate application programs and can issue a variety of processing requests in the form of messages, a kernel space 12 for controlling the whole data processing system, and a server space 17 which processes the requests issued by the client spaces 11 and accommodates therein programs 41a and 41b for executing the processing as requested. Further, a reference numeral 40 denotes a kernel of an operating system which incorporates a message communication facility 40. Messages sent from the client spaces 11 to the server space 17 are denoted by reference numerals 13a, 13b and 13c, respectively.

With the structure of the data processing system described above, transfer of the messages is performed on the presumption described below for realizing a variety of processing requests.

(a) The individual spaces are so created as to operate completely independent of one another, wherein each space constitutes a minimum unit for which security is to be ensured.

(b) Transactions of request and response between the client spaces 11 (inclusive of the kernel space 12) and the server space 17 are performed by using the messages 13a, 13b, 13c, etc. The server space 17 can accept the requests from a plurality of client spaces 11.

(c) To allow the server space 17 to discriminate the messages 13a, 13b and 13c from one another, the client space 11 adds an object operation code or OOC in abbreviation (hereinafter referred to as the request code) to each message as it is issued. The content of the request code OOC is previously determined so that the code serves as an interface agent between the server space 17 and the client space 11.

(d) The spaces can be classified into a public space which includes the client spaces and the intrinsic server space and which occupies one virtual address space and a kernel space 12 which shares a control table with a program of the kernel 40 for controlling the whole system.

In operation, when the client space 11 issues a message 13 having a request code OOC set therein to the destination server space 17, the message communication facility 14 serving as the mediator mentioned hereinbefore sends that message 13 to the server space 17. Upon reception of the message 13, the server space 17 identifies discriminatively the content or type of the request message by checking the request code OOC contained in the message 13 to thereby activate the program 41a or 41b, which is adapted to execute the processing requested by the message as identified.

Figure 7:
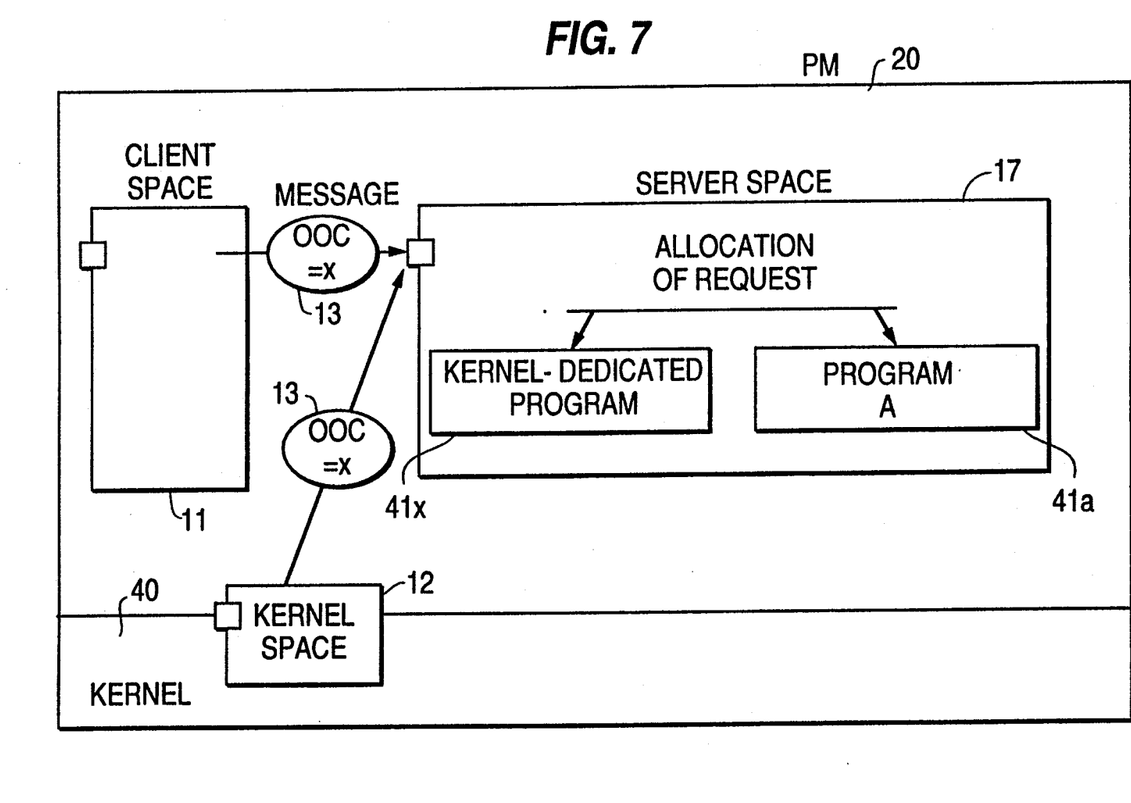
FIG. 7 is a diagram for illustrating difficulties from which the prior art data processing system suffers.

The data processing system described above suffers from a problem, which will be elucidated below by referring to FIG. 7 of the accompanying drawings.

In the first place, it must be pointed out that the message 13 issued from the kernel space 12 which is destined to control the whole system has specific and important content or meaning in contrast to the messages issued from the public client space 11. Nevertheless, there may arise such situation in the case of the data processing system now under consideration that a request code (e.g. OOC=x) indicating a request message which is intrinsically allocated to the kernel space 12 is erroneously placed in the request message 13 issued from a client space 11 with malicious intent or inadvertently. In that case, the above-mentioned message will be interpreted as one originating from the kernel space 12 regardless of the fact that the sender of that message is actually a client space 11. Consequently a processing request which controls the whole system can be issued from the client space, thereby endangering the security.

SUMMARY OF THE INVENTION

It is an object of the present invention to solve the problem of the message-based data processing system known heretofore and to provide an improved message-based data processing system which is capable of affirmatively preventing the request intrinsic or inherent to the kernel space from being issued by any of the client spaces with malicious intent or inadvertently to thereby ensure the security of the server spaces and the whole system with enhanced reliability.

In view of the above and other objects which will become apparent as the description proceeds, there is provided according to an aspect of the present invention a data processing system operating on a message basis which comprises at least one client space which can issue a processing request in the form of a message, at least one server space for receiving the processing request to allow the processing designated by the request message to be executed correspondingly by identifying the type of a request code placed in the message, the request code being previously classified into a client-space dedicated request code and a kernel-space dedicated request code, message communication means for performing message transfer processing, and check means incorporated in the message communication means for checking whether the message really originates in the kernel space when the request code contained in the message as received is the kernel-space dedicated request code, wherein the processing request message issued from other space than the kernel space by using the kernel-space dedicated request code is rejected as an error.

With the arrangement of the message-based data processing system described above, security of the kernel space and hence that of the system can be positively be assured.

The invention will become more readily apparent from the following description of preferred or exemplary embodiments thereof shown, by way of example only, in the accompanying drawings.

DESCRIPTION OF THE PREFERRED EMBODIMENTS

Now, the present invention will be described in detail in conjunction with an exemplary or preferred embodiment thereof by reference to the drawings.

Figure 1:
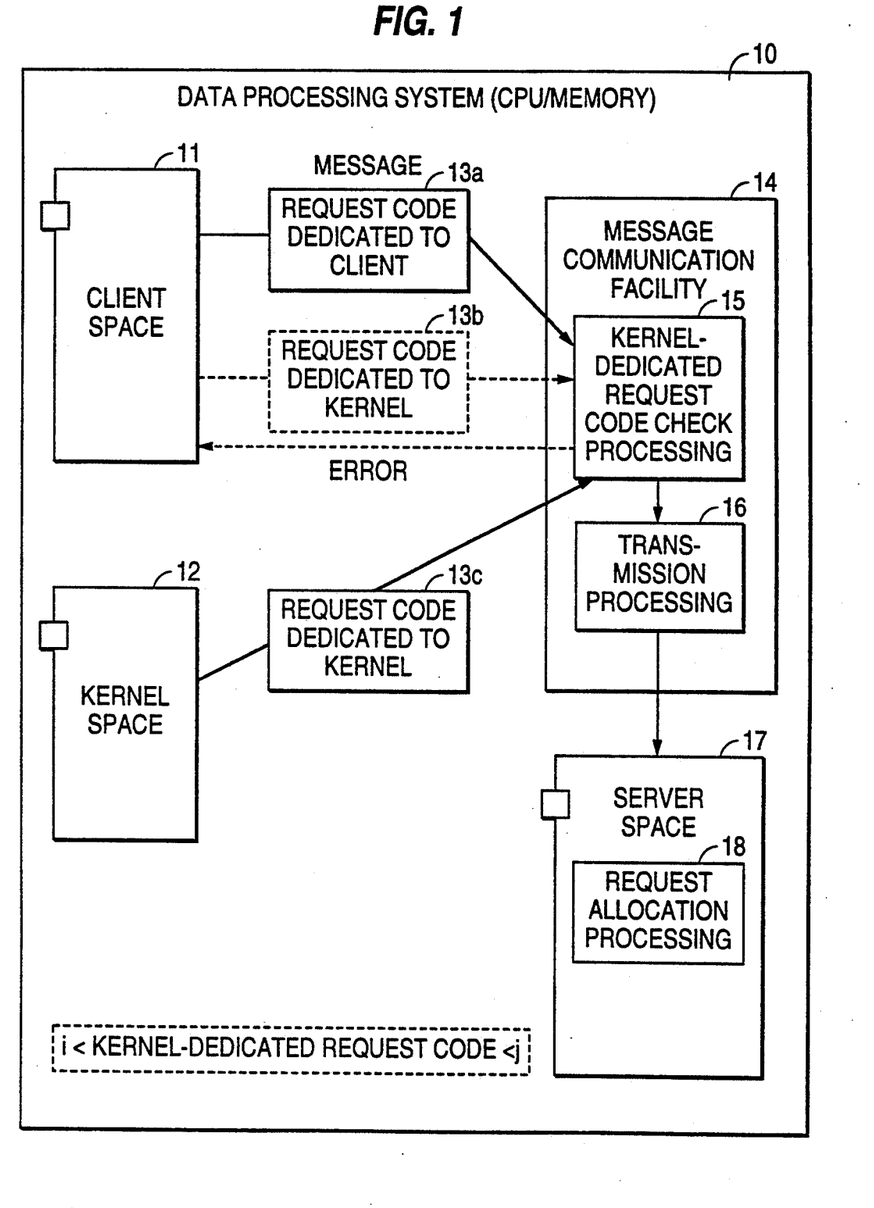
FIG. 1 is a diagram for illustrating the concept or principle underlying the present invention.

FIG. 1 is a diagram for illustrating the concept or teachings of the present invention. Referring to the figure, a data processing system operating on a message basis according to an embodiment of the invention is generally denoted by a reference numeral 10 and includes as primary components at least one central processing unit (CPU), a memory, input/output units and others, although not shown in detail. Provided internal to the data processing system 10 is a public client space 11 which accommodate application programs and can issue a variety of requests, a kernel or nucleus space accommodating the privileged or primitive part of an operating system used for executing a processing to control the whole system, and a message communication facility 14 which serves for controlling transfer of messages and which incorporates a kernel-space dedicated request code checking part 15 for checking a request code (OOC) placed in the processing request message as to whether it is dedicated to the kernel space 12 and a transmission processing part 16. Further, there is provided at least one server space 17 used for processing the requests, wherein the server space 17 includes a request allocation or distribution processing part 18.

As will be seen in FIG. 1, the data processing system 10 is implemented in a client/server architecture and operates on a message basis such that the system executes processings indicated by the requests issued from the client space 11 to the server space 17 in the form of messages 13a, 13b, 13c, etc., wherein the server space 17 identifies discriminatively the requests by checking the request codes embedded in the messages, respectively, for allowing the processing as requested to be executed in dependence on the request code.

According to the teaching of the present invention, the request codes (OOC) to be placed in the messages are previously classified distinctly into request codes dedicated to the client space 11 for the application program and request code dedicated to the kernel space 12, wherein upon validating the interface between the client space and the server space 12, the request code is checked as to whether the request code lies within a predetermined range specific to the client-space dedicated codes or in the range specific to the kernel-space dedicated code, to thereby determine whether a processing of concern represented by a message originates in the client space 11 or in the kernel space 12.

To this end, the request code check function is provided. More specifically, the message communication facility 14 which is in charge of the message transfer control incorporates a kernel-space dedicated request code check part 15 which checks the request code (OOC) placed in the message as to whether the request code is the client-space dedicated code or the kernel-space dedicated code.

When the request code is decided to be the kernel-space dedicated code, the code check part 15 then makes a decision as to whether or not the message affixed with the kernel-space dedicated code really originates in the kernel space, by consulting a space control table, as described hereinafter.

In the case where the request code contained in the message being issued is not the kernel-space dedicated code or when the message of concern is decided as really originating in the kernel space 12, the message transmission processing part 16 performs a message transfer processing to send the message to the server space 17 which is the destination of the message. Upon reception of the message, the server space 17 checks the type of the request code, whereon the request is sent to a corresponding OS function unit through the request distributing part 18 to allow the processing as requested to be executed.

When it is decided as the result of the check performed by the kernel-space dedicated request code check part 15 that other space than the kernel space 12 (i.e. client space) is issuing a message by using the request code dedicated to the kernel space 12, this message is disposed of as error, whereon an error message is sent to the request message sender space or alternatively the request message mentioned above is neglected.

Values which the request codes dedicated to the kernel space 12 can assume should previously be so determined as to fall within a predetermined range, for example, from i to j inclusive or exclusive. In that case, the values of the request codes used by the public client spaces 11 are so selected that they fall within a range smaller than i or a range greater than j exclusive or inclusive.

As will be appreciated from the foregoing, whenever a client space 11 issues a processing request by placing the client-space dedicated request code (this code will also be referred to as the public request code) in a request message 13a, for example, the processing request message 13a is normally sent to the server space 17 through the message communication facility 14. Similarly, when the kernel space 12 issues a processing request by setting the request code dedicated thereto in a message 13c, the request message is sent to the server space 17 through the message communication facility 14, since the message 13c can pass the check performed by the kernel-space dedicated request code checking part 15. On the other hand, when a message containing the kernel-space dedicated request code is issued from the client space 11 with malicious intent or inadvertently, as exemplified by a message 13b, this message is decided to be an error message as the result of check function of the kernel-space dedicated request code checking part 15, whereby the message is inhibited from being sent to the server space 17.

Figure 2:
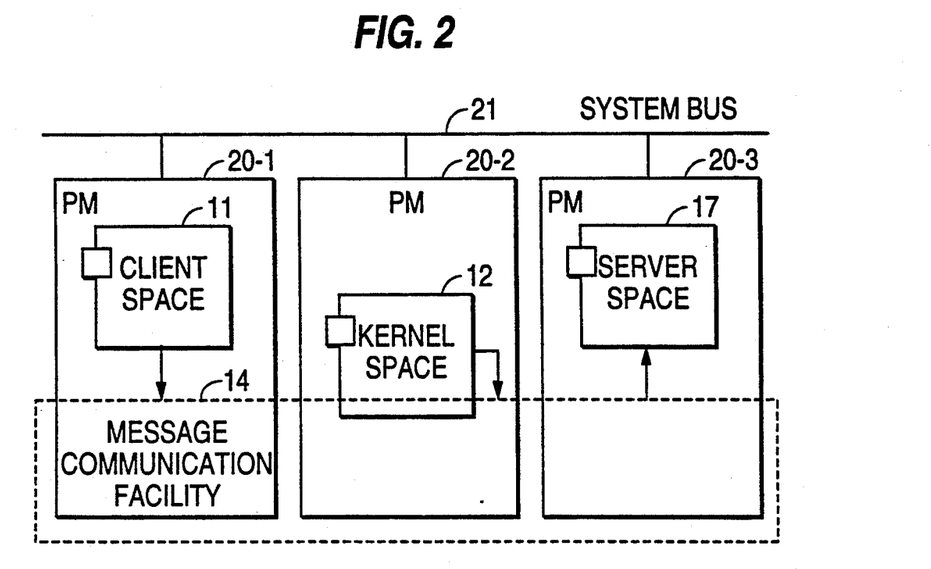
FIG. 2 is a block diagram showing schematically a structure of a data processing system according to an exemplary embodiment of the invention.

FIG. 2 shows, by way of example only, a hardware structure of the data processing system according to the invention. In the figure, reference numerals 20-1, 20-2 and 20-3 denote processor modules (PM) each including at least one CPU and interconnected to one another through a system bus 21 which is used for communication, data transfer and other purposes between or among the processor modules 20-1, 20-2 and 20-3.

Referring to FIG. 2, the client space 11, the kernel space 12 and the server space 17 are provided independently from one another to ensure security of these spaces, respectively. Communication between these spaces is realized through the medium of the message communication facilities 14 disposed distributively in the processor modules (PM) 20-1, 20-2, 20-3, etc., respectively. The kernel space 12 shares a control table with a kernel program of the operating system for controlling the whole system.

The server space 17 receives the message representing a processing request issued from the client space 11 or the kernel space 12 to identify the processing request message by checking the request code (OOC) contained in the message and allows the processing as requested to be executed by the associated server. As described hereinbefore, the request codes are classified into the code dedicated to the client spaces and the code which can be used only by the kernel space (i.e. the kernel-space dedicated request code).

The program for the kernel space 12 is loaded only once upon initial program loading (IPL) of the system and no kernel space can be created newly after the initial program loading. In association with the kernel space 12, a control table (described hereinafter) is provided for managing or controlling the spaces provided internally of the system. The control table contains the information representing the identity of the kernel space 12 itself.

On the other hand, the client spaces such as exemplified by the space 11 can be created, as occasion requires, even after the initial program loading (IPL).

Relations among the kernel space 12, the server space 17 and the client space 11 in the data processing system now under consideration will be described below in more detail.

As mentioned previously, the functions of the operating system are divided into a plurality of function units such as file management, terminal management, fault management and so forth, wherein the spaces for these function units resulting from the division are created on a virtual memory space and referred to as the server spaces. Parenthetically, the kernel space 12 is also one of the server spaces and imparted with privilege, although it sends messages to the other server spaces as in the case of the client space. By way of example, it is only the kernel space 12 that can serve for the primitive functions of the operating system such as space creation and/or deletion and the like.

On the other hand, the client spaces are those spaces in which user application programs can run and differs from the server spaces capable of providing the functions of the operating system, inclusive of the kernel space.

Figure 3:
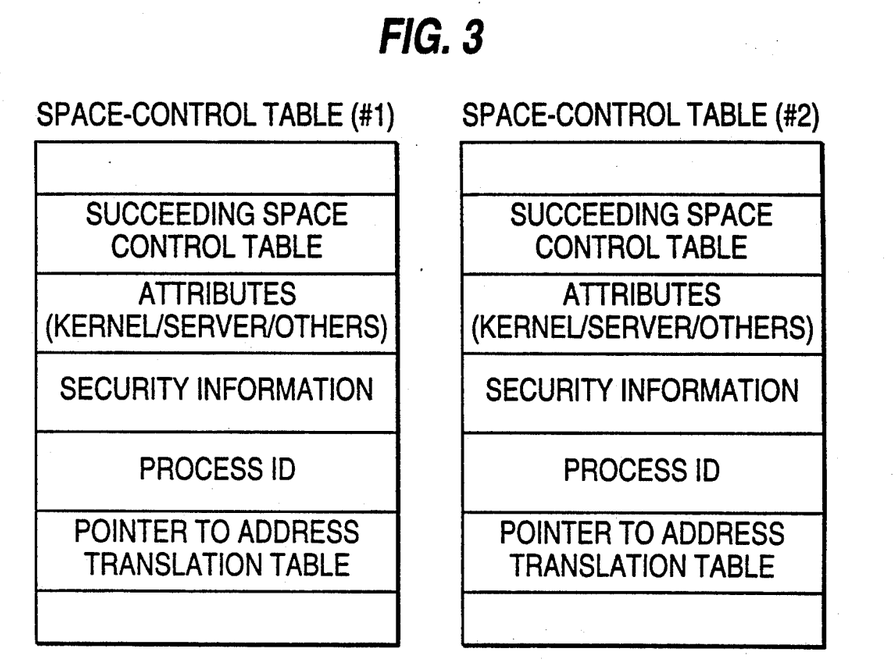
FIG. 3 is a view showing a structure of a space control table used for managing client/server spaces in the data processing system shown in FIG. 2.

FIG. 3 shows a structure of a space control table provided for the purpose of managing the spaces mentioned above.

Each of the spaces is provided with the space control table such as shown in FIG. 3 for the space management. The space control table includes a pointer field for storing a pointer pointing to a succeeding space control table, an attribute information field storing attribute information indicating whether the associated space is the kernel space or the other server space or the client space, a security information field indicating access authorization to various resources, a process ID field for identifying the process operating in the associated space, a field storing a pointer pointing to an address translation table of the associated space.

The individual spaces mentioned above transfer with one another processing requests and results of execution of the requested processing in the form of messages, respectively. More specifically, the client space 11 can issue a request for service of a function of the operating system to the server space 17. In response thereto, the code check part 15 of the message communication facility 17 performs the requisite authorization check on the request issued from the client space 11. When it is found as the result of the check that the client space 11 is authorized to receive the service, the server space 17 can provide the requested service to the client space 11.

The system which is implemented to perform the data processing through the transaction of the request messages and the response messages between the client space 11 and the server spaces 17 are referred to as the message-based data processing system.

As mentioned hereinbefore, the transactions of the messages are realized through the medium of the message communication facility 14.

In conjunction with the message, it is however noted that a single server space is imparted with many functions. For example, the file management server space is not only imparted with file open/close function but also a file creation function and the like. In other words, one server space is generally capable of providing a number of functions to the client space. Accordingly, if the destination or sink server spaces of the messages which differ from one to another function requests are to be managed, there will be required an enormous amount of resources for the management. Such being the circumstances, each message is affixed with the request code for thereby allowing the request represented by the message to be allocated to the server which can provide the service as requested by the message. Interface between the client space and the server space can thus be realized by means of the request code identifier and detailed information of the request code. In the case of the file open request, for example, the request code identifier may be "OPEN", while the detailed information may be the name of the file to be opened. The request codes are managed on the basis of the message destination (sink) or the capability (which may also be referred to as the port) by a supervisory system.

Figure 4:
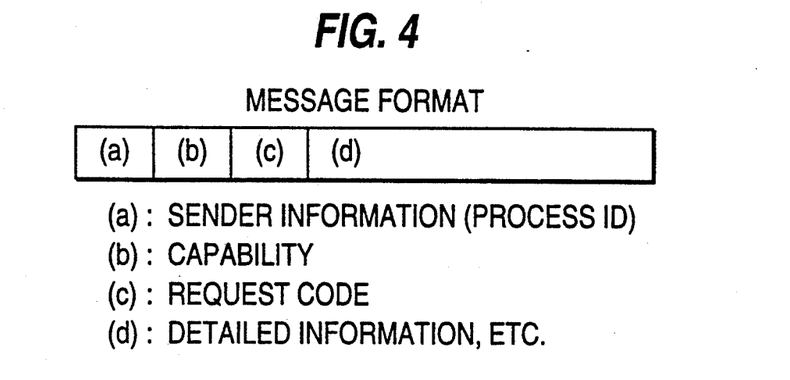
FIG. 4, consisting of (a)-(d), is a view showing a format of message used for transmitting processing requests in the system shown in FIG. 2.

FIG. 4 shows a format of the message to this end, by way of example only. As can be seen in this figure, the message includes a process sender identifier (process ID) identifying the message sender space, capability information indicating the sink or destination of the message, the request code indicating the type of the request, and the detailed information of the request.

The code check part 15 incorporated in the message communication facility 14 makes decision as to whether or not the request code placed in the request message is the kernel-space dedicated request code (i.e. whether the value of the request code is within the range delimited by i and j). When the message of concern is decided as containing the kernel-space dedicated request code, then it is checked whether or not the message is actually issued from the kernel space by consulting the space control table mentioned above (FIG. 3).

When it is decided on the basis of the space control table that the message of concern really originates in the kernel space 12, the message transmission processing is executed. On the other hand, when it is found as the result of the check performed by consulting the space control table that the message of concern originates in other space than the kernel space 12, the message transfer processing is discontinued. In this manner, the message issued from the client space and added with the kernel-space dedicated code can positively be prevented from reaching the server space 17.

Figure 5:
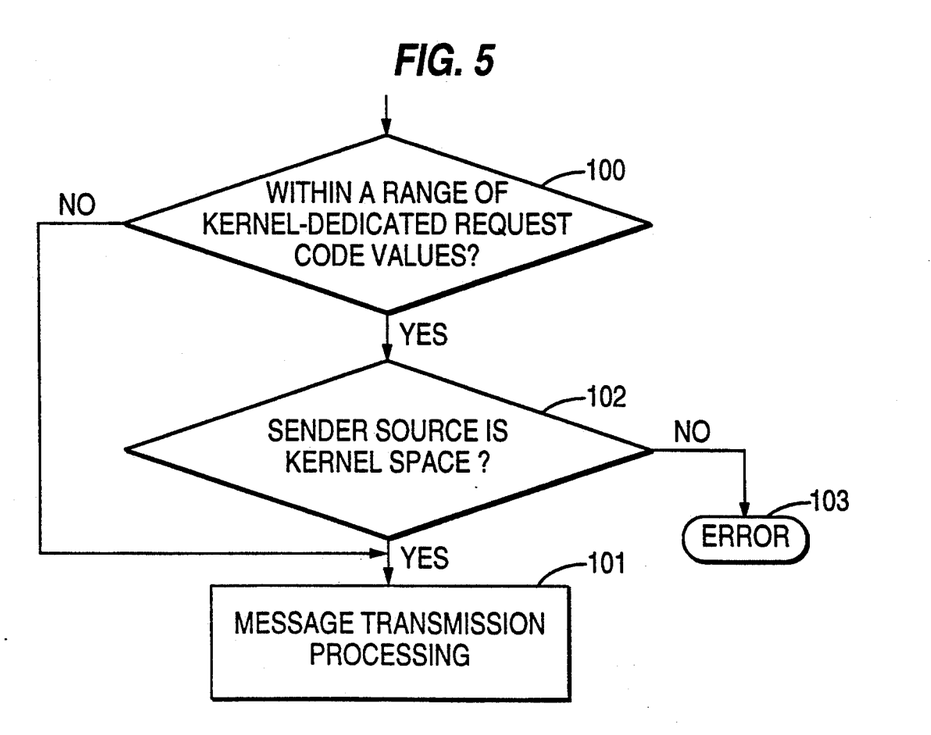
FIG. 5 is a flow chart for illustrating processings executed by a message communication facility incorporated in the system shown in FIG. 2.

FIG. 5 is a flow chart for illustrating the processing executed by the code check part or function 15 of the message communication facility 14.

Referring to the figure, the code check part 15 incorporated in the message communication facility 14 checks the request code upon every reception of processing request message to thereby decide whether the value of the request code falls within the range of the values assigned to the kernel-space dedicated code in a step 100. If the answer of this decision step 100 is negative (NO), the processing jumps to a message transmission processing step 101.

On the other hand, when the presence of the kernel-space dedicated request code is determined, it is then decided by consulting the space control table (FIG. 3) whether or not the source space in which this message originates is the kernel space (step 102). When it is decided that the source of the message is a client space, this means that the request code has been placed in the message with malicious intent or inadvertently. Accordingly, the message transfer processing is discontinued (step 103).

Unless the request code represents the kernel-space dedicated code or in case the request code is decided as the kernel-space dedicated request code affixed to the message which really originates in the kernel space, by consulting the space control table, the message transfer processing is performed as in the case of the data processing system described hereinbefore.

As will now be appreciated from the foregoing description, it is possible according to the teaching of the present invention to protect a specific and important message intrinsic to the kernel space against the misuse while preventing the kernel message from being issued from the client space. Thus, the security of the message as well as the kernel space and hence integrity of the data processing system can be ensured with an enhanced reliability.

While the invention has been described in terms of its preferred embodiments, it should be understood that numerous modifications may be made thereto without departing from the spirit and scope of the invention as defined in the appended claims. It is intended that all such modifications fall within the scope of the claims.

What is claimed is:

1. A data processing system including a central processing unit and a memory and operating on a message basis, said data processing system comprising:

at least one kernel space, each kernel space issuing a processing request message with a request code classified by the data processing system as a kernel-space dedicated request code, and with sender information indicating issuance of the processing request message by the kernel space;

at least one client space, each client space issuing a processing request message with a request code classified by the data processing system as a client-space dedicated request code and with sender information indicating issuance of the processing request message by the client space, the client-space dedicated request code being subject to alteration within the data processing system;

at least one server space, each server space receiving said processing request message and allowing processing designated by the processing request message to be executed in accordance with the request code of the received processing request message; and message communication means for transferring the processing request message from one of the kernel space and the client space to the server space and further comprising check means for checking whether the sender information of the processing request message indicates a kernel space as the sender when the request code contained in the processing request message is a kernel-space dedicated request code, wherein the processing request message is rejected when the request code is one of the kernel-space dedicated request codes and the sender is a space other than the kernel space.

2. A message-based data processing system comprising at least one central processing unit, an operating system, at least one application program, and a memory, wherein the operating system is divided into function units which are accommodated in server spaces created in the memory, said message-based data processing system comprising:

a kernel space, created in the memory, which accommodates primitive functions of said operating system and issues processing request messages, each processing request message being affixed with a request code identifying a source of said processing request message;

a client space, created in the memory, accommodating the at least one application program, each client space issuing a processing request message affixed with a request code identifying a source of said message as the client space, for requesting service of said operating system, said request code being subject to alteration within the data processing system;

message communication means, responsive to the request code of a processing request message, for transferring each processing request message to a server space which can perform the service requested in accordance with request code of the processing request message being transferred thereby; and request code check means for checking said request code of the processing request message being transferred by the message communication means to determine whether said request code affixed to said processing request message, when issued from said client space, is identical to the request code assigned to a processing request message issued from said kernel space, and for inhibiting said message communication means from transferring said processing request message to the server space when said request code affixed to said processing request message is identical to said request code indicating that the processing request message was issued from the kernel space.

3. A message-based data processing system according to claim 2, wherein said request code may be assigned one of a range of values, the range of values assigned to said request code affixed to the processing request message issued from said client space differing from the range of values assigned to request codes affixed to the processing request messages issued from said kernel space.

4. A message-based data processing system according to claim 3, further comprising space control table means which contains at least space identification information, wherein when said check means decides that the value of the request code affixed to the processing request message received by said communication means falls within the range of values of the request code assigned to said kernel space, wherein said check means consults said space control table means for deciding whether said processing request message originated in said kernel space, and for rejecting said processing request message when said check means decides that said processing request message did not originate in said kernel space.

5. A message-based data processing system according to claim 3, wherein said message includes fields containing at least message source space identification, message destination space identification, said request code and detailed information of said message.

6. A message-based data processing system according to claim 3, wherein server space allocates the processing request message to one of the function units capable of processing said request in dependence on one of the range of values of said request code contained in said processing request message.

7. A message-based data processing system according to claim 2, wherein said message-based data processing system comprises:

a plurality of processor modules each including said client space, said kernel space and said server space; and a system bus interconnecting said plurality of processor modules, wherein said message communication means is distributively provided in said plurality of processor modules.

* * * * *

UNITED STATES PATENT AND TRADEMARK OFFICE
CERTIFICATE OF CORRECTION

PATENT NO. : 5,317,746
DATED : May 31, 1994
INVENTOR(S) : Kazuko WATANABE

It is certified that error appears in the above-indentified patent and that said Letters Patent is hereby corrected as shown below:

Column 2, line 29, delete "of".

Column 3, line 31, after "security"

insert --of the system--;

line 67, delete "be"

(second occurrence only).

Signed and Sealed this

Tenth Day of January, 1995

Attest:

BRUCE LEHMAN

*Attesting Officer*         *Commissioner of Patents and Trademarks*